United States Patent [19]

Chauvin

[11] Patent Number: 4,576,089
[45] Date of Patent: Mar. 18, 1986

[54] AUTOMATIC ROUX MAKER

[76] Inventor: John A. Chauvin, 921 Solon, Gretna, La. 70054

[21] Appl. No.: 667,321

[22] Filed: Nov. 1, 1984

Related U.S. Application Data

[62] Division of Ser. No. 422,570, Sep. 24, 1982, Pat. No. 4,492,713.

[51] Int. Cl.⁴ ............................................. A47J 27/62
[52] U.S. Cl. ....................................... 99/332; 99/337; 99/348; 366/142; 366/146; 366/312; 366/326
[58] Field of Search ................. 99/331, 332, 337, 348; 426/231, 519; 366/142, 146, 279, 312, 326

[56] References Cited

U.S. PATENT DOCUMENTS

| | | | |
|---|---|---|---|
| 3,804,957 | 4/1974 | Purves | 426/519 X |
| 3,810,605 | 5/1974 | Lambert | 366/326 X |
| 4,151,792 | 5/1979 | Nearhood | 99/348 |
| 4,339,992 | 7/1982 | Kurland | 99/348 |

FOREIGN PATENT DOCUMENTS

| | | | |
|---|---|---|---|
| 3045308 | 7/1982 | Fed. Rep. of Germany | 99/348 |
| 3045371 | 7/1982 | Fed. Rep. of Germany | 99/348 |
| 2032614 | 11/1970 | France | 99/348 |
| 2525119 | 10/1983 | France | 99/348 |

Primary Examiner—Billy J. Wilhite
Attorney, Agent, or Firm—C. Emmett Pugh & Associates

[57] ABSTRACT

An automatic roux maker including a pot for heating and agitating (mixing and moving) the roux during the cooking process, in which a motor-driven agitator is included and suspended within the pot for mixing the roux during cooking and for preventing scorching of the roux. At the bottom of the centrally located agitator shaft is included, for example, two diametrically opposed, paddle arms which ride and sweep on the bottom of the pot and are pivotally connected to a slotted support which is capable of floating up-and-down with respect to the agitator shaft. The flexible sweeping of the bottom of the pot prevents any of the roux from remaining on the bottom of the pot for any significant period of time, preventing scorching of the roux. A timed thermostat driven controller utilizing the information from a thermostat sensor included within the pot maintains the temperature within the desired range for the desired period of time and also continues the rotation of the agitator shaft after the cooking cycle has been stopped until a lowered, set, safe temperature of the roux occurs, which prolonged agitation continues to prevent any scorching of the roux during the elevated portion of the cool-down cycle.

5 Claims, 4 Drawing Figures

AUTOMATIC ROUX MAKER

CROSS-REFERENCE TO RELATED APPLICATIONS

This application is a divisional application of Ser. No. 422,570 filed Sept. 24, 1982, now U.S. Pat. No. 4,492,713.

BACKGROUND OF THE INVENTION

1. Field of the Invention

The present invention relates to a timed, temperature controlled agitation and cooking system and associated agitator and cooking pot and to a method and a combined agitator/cooker for automatically making roux. More particularly, the present invention relates to an automatic system designed to brown flour in a roux by mixing for example wheat flour with cooking oil while applying constant, controlled heat to the ingredients while agitation is controlled and prolonged to prevent any scorching of the roux.

2. Prior Art Background

A roux is a basic cooking ingredient used especially in French and Creole cooking, as well as in Continental and Italian cooking, and is used for example as a base for making gravies, soups, sauces, etc. A roux is made by cooking a mixture of browned flour and vegetable oil or other fat based substance until the desired cooked, browned mixture is reached. In classical French cooking, the roux is made by mixing browned flour with melted butter.

For further background information on the ingredients of the prior art steps for making a roux, various excerpts from cook-books are presented below:

*Larousse Gastronomique*, by Prosper Montagné; Crown Publishers, Inc., New York (1961):

> "ROUX—Mixture of butter or other fatty substance and flour, cooked together for varying periods of time depending on its final use.
> The roux is the thickening element in sauces.
> There are three kinds of roux: white roux, blond roux and brown roux.
> Brown roux is used to thicken rich brown sauces like "Espagnole" and "Demi-glace" (see SAUCE). It is made by cooking flour in clarified butter in the oven, gently and for a long time, stirring frequently. The clarified fat from a marimite may also be used, but in each case the proportions are equal amounts by tablespoons of flour and of butter or fat.
> This roux should be a good light brown colour. It can be kept for quite a long time.
> Blond roux is made only with butter. The proportions of butter and flour are the same as for brown roux. It is cooked more rapidly and is only made at the moment it is needed. Its colour should be a pale gold.
> White roux is used for "Béchamel" and "Velouté" sauces and special thick soups.
> It is made by cooking flour and clarified butter for 5 minutes over the heat and stirring constantly with a wooden spoon."

*Joy of Cooking*, by Irma S. Rombauer et al; Bobbs-Merrill Co., Inc., Indianapolis, Indiana (1964):

> "Roux—The most common thickeners for savory sauces are the roux—white, blonde or brown. All of these are made of the same ingredients to begin with, but change in character as heat is applied. These mixtures of flour and fats are blended gently over very low heat from 5 minutes to a much longer period, depending on your available time and your patience. White roux should not color; blonde, barely; and brown should reach the color of hazelnut and smell deliciously baked. Unless a roux is cooked long enough to dispel the raw taste of flour, the unpleasant flavor will dominate the strongest stocks and seasoning. And unless the flour and butter are stirred to distribute the heat to allow the starch granules to swell evenly, they will later fail to absorb the liquid. Therefore the sauce will be thin. This heated blending period is important. Using too high heat to try hurrying it will burn the flour, giving it a bitter taste and it will shrink the starch, making in incapable of continuing to swell.
> For White roux-based sauces, see Béchamel, page 322; for blonde, see Banquette de Veau, page 419; for brown, see Sauce Espagnole, page 326. Since most cooks use some form of roux every day, you may find it a time-saver to make on in advance and store it in tablespoon size units under refrigeration. It will keep in the freezer, too, for several months if you do the following: when the roux has been cooked to the desired color and is still soft, measure it by tablespoons on a baking sheet and freeze. Transfer the frozen wafers to a plastic bag or wide-topped container and store in the freezer. To thicken sauce, drop several wafers of the original roux in the sauce to reach the thickness desired. Or you may soften wafers in a double broiler over hot water and proceed as usual with the making of the sauce."

*A Concise Encyclopedia of Gastronomy*, by André L. Simon; Bramhall House, New York (compilation of previous publications 1939–1946):

> "ROUX—a generic term for various flour bindings. A roux is sometimes brown, sometimes white of "blond", according the use that it is intended for. It is really but a Béchamel sauce (q.v.) in its essentials. One or more spoonfuls of butter are placed in a small saucepan and, when it is melted, the same amount of flour is added and stirred into the butter. If a "thin" sauce is required, one spoonful of flour is used to two of butter. The mixture must colour gently to the desired shade, then the liquid indicated by the recipe is added, little by little, and the sauce seasoned as desired and allowed to mellow by the side of the stove. The dripping from a piece of roast meat is sometimes used instead of butter; this improves the flavor of the sauce if intended to be served with the roast."

To prepare a roux in the past has taken a great amount of attention, care and time with much hand stirring to produce a quality roux and in particular to prevent scorching of the roux. As a result of these demanding factors, the automatic preparation of a roux has, it is believed, never been heretofore achieved on a practical basis, requiring a relatively great deal of time, patience and skill in the preparation of roux by hand by commerical processors, chefs and home consumers.

SUMMARY DISCUSSION OF INVENTION

The present invention is directed to an automatic cooking system designed to brown the flour into a roux by mixing wheat flour with oil and applying a constant, controlled heat to the ingredient with controlled, prolonged agitation. In the system, the heat and agitation is properly controlled until the roux is darkened to the desired degree with controlled heat and color without scorching, thereby replacing hand stirring for long periods of time.

The cooking system of the present invention includes a pot and associated, controlled agitator in which the agitator blades or paddles are weighted and pivoted to a floating rotor connection so that the bottom areas of the floating rotor connector and pivoted bars are in continuous contact with the bottom of the roux pot to minimize the contact of the flour and oil ingredients for no more than, for example, one second, thus preventing any scorching exposure of the mix while it is at a substantially elevated temperature.

The browning of the mix is controlled by a timed, thermostatically driven controller setable for, for example, "light," "medium" or "dark" roux, which automatically turns off the heating energy (whether electric or gas or otherwise) when the roux reaches the cooking duration required. However, although the controller turns off the heating energy, it continues to allow the agitator to be turned without the application of heat until the roux mix has cooled down to a temperature of for example 130 degrees F. The roux is then complete and can be stored at normal room temperatures until needed for use.

The preferred embodiment of the present invention includes a centrally located shaft carrying in floating fashion two diametrically-opposed, pivoted paddle arms extending completely across the diameter of the pot bottom, although of course more or less blades could be used depending upon the size of the pot, speed of rotation and the cooking temperature of the system.

By using the foregoing features of the invention, the present invention achieves in a practical, reliable and relatively inexpensive fashion a method and apparatus for automatically preparing a roux according to desired specifications without the need for any significant manual supervision or intervention, and all at a relatively low cost.

BRIEF DESCRIPTION OF THE DRAWINGS

For a further understanding of the nature and objects of the present invention, reference should be had to the following detailed description, taking in conjunction with the accompanying drawings, in which like parts are given like reference numerals and wherein.

DETAILED DESCRIPTION OF THE PREFERRED EMBODIMENT

Cooker

Figure 1:
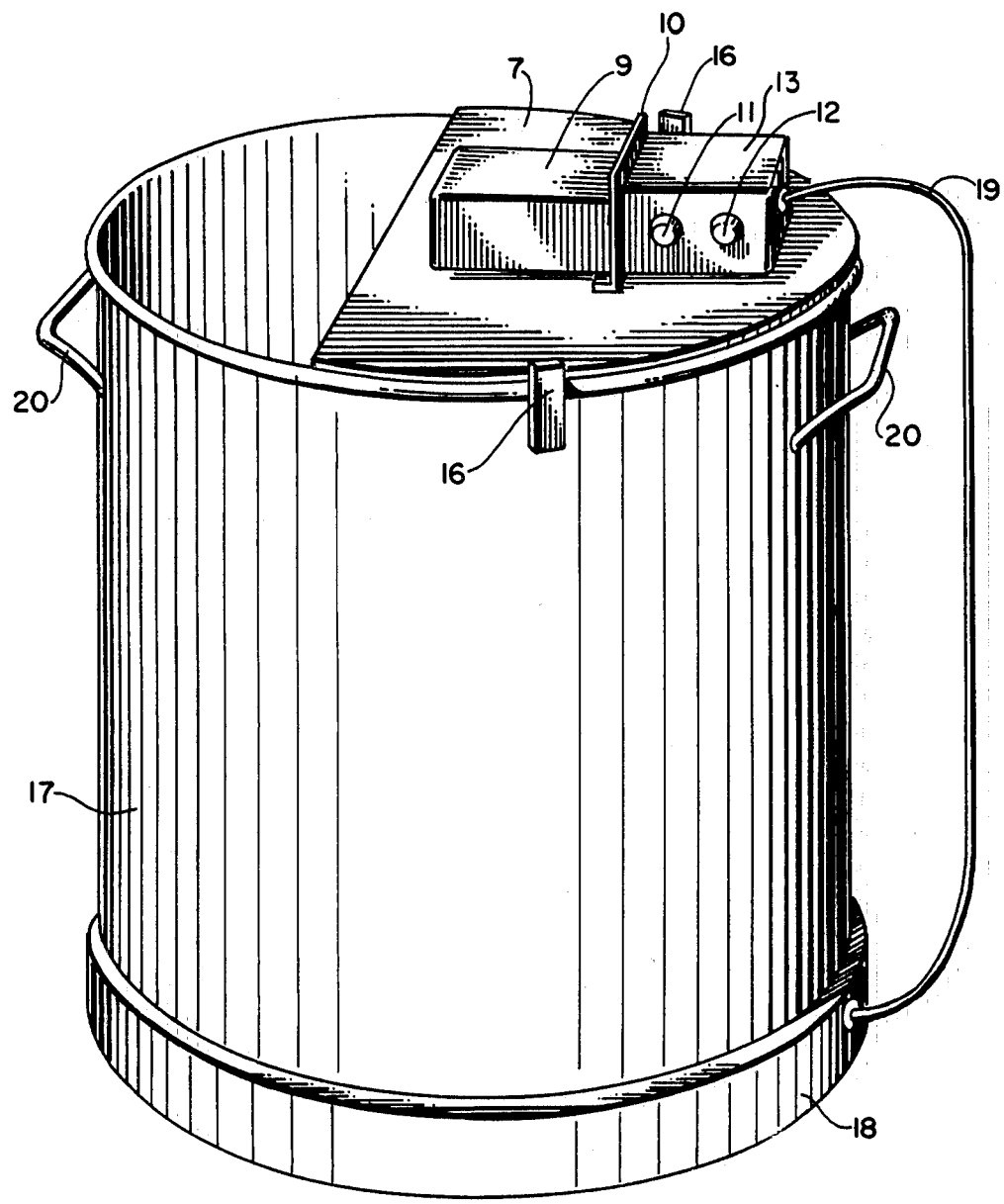
FIG. 1 is a perspective view of the preferred embodiment of the automatic roux making cooker of the present invention.
Figure 2:
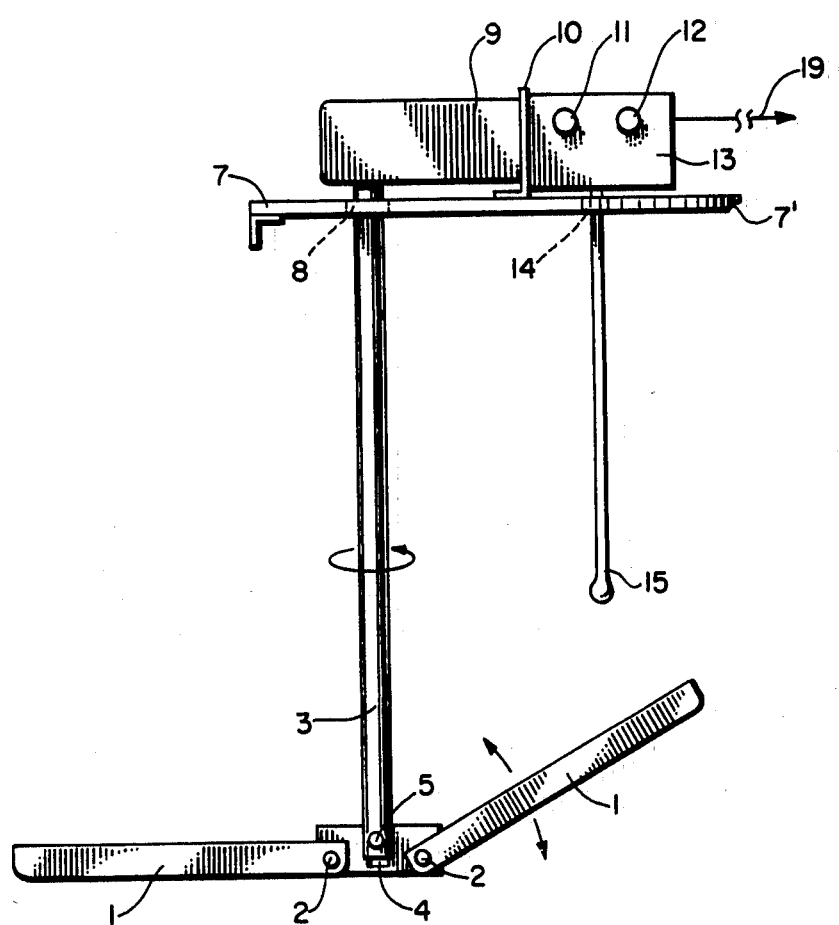
FIG. 2 is a side view of the agitator and controller system elements of the automatic roux maker cooker illustrated in FIG. 1, with one of the agitator paddle bars lifted to illustrate its pivoting action.
Figure 3:
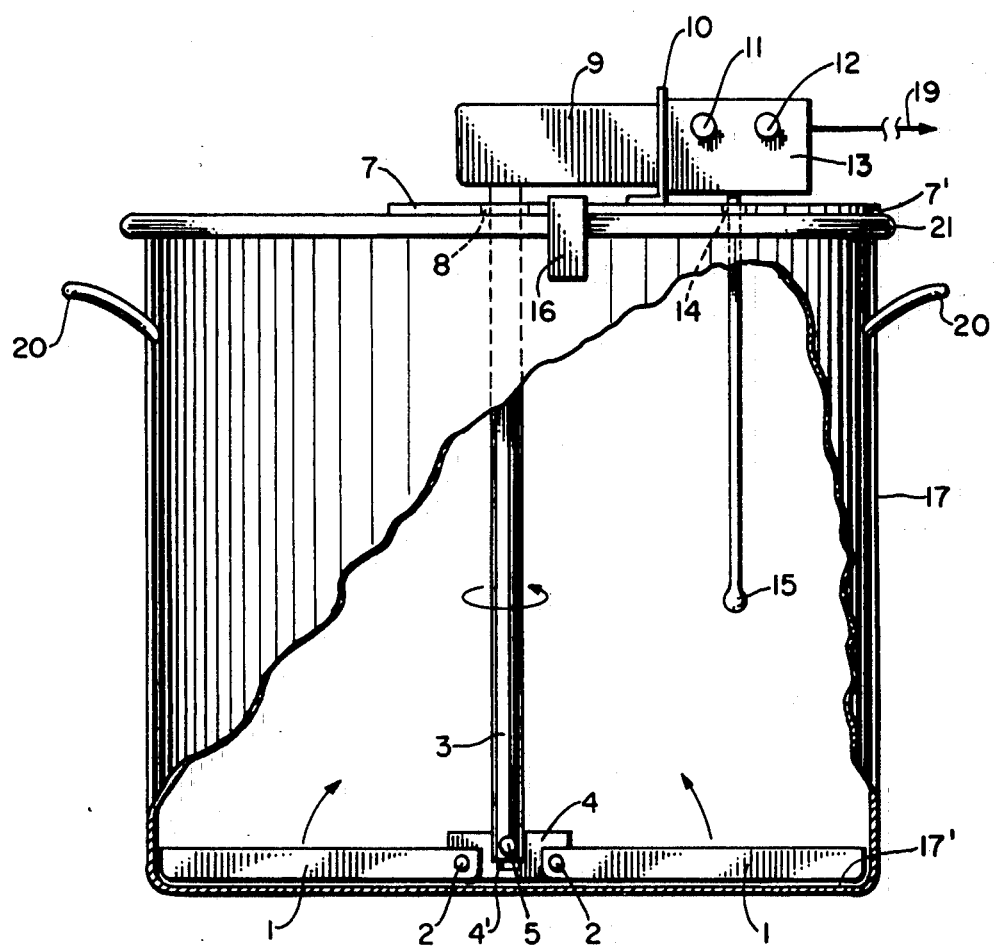
FIG. 3 is a side view of the cooker of FIG. 1 (without the electrical heater) with the pot partially cut away to show the interior placement of the agitator member and the thermostatic sensor, which is part of the controller system.

As shown primarily in FIGS. 1 and 3, the preferred embodiment of the automatic roux maker of the present invention comprises three basic elements: An agitator-temperature controller system of FIG. 2, a preferably cylindrical shaped, flat bottomed cooking pot 17, a the source of cooking heat 18 for the pot 17. The agitator and controller system of FIG. 2 is likewise comprised of three basic elements, namely the motor driven agitator 1–9, the controller system 11–15, and the mounting structures for them, including lid 7 and bracket 10 which mount and support the agitator and controller system on the pot 17.

Figure 4:
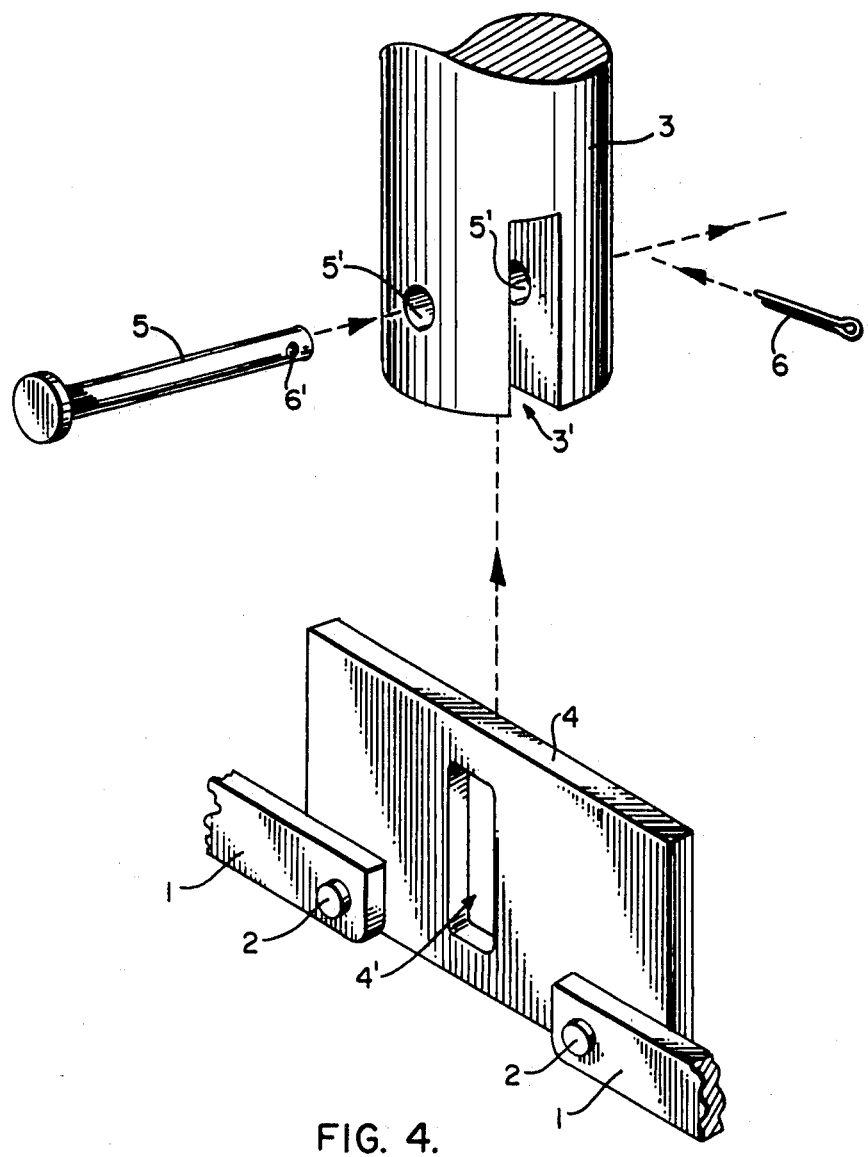
FIG. 4 is a partial, perspective, close-up view of the attachment between the agitator shaft and the floating connection of the pivotable paddle bars of the embodiment of FIGS. 1–3.

As can best be seen in FIGS. 2 and 3, the agitator system includes a centrally-located, vertical rotor shaft 3 which carries at its bottom diametrically opposed, weighted, radially extending, paddle arms or bars 1 which are pivotally attached by pivot pins 2 to the rotor 3 by means of a centrally located, floating support connector plate 4. As can best be seen in FIG. 4, the floating connector 4 includes a slot 4' which loosely fits within a slotted groove 3' in the bottom of the rotor 3, with the connector 4 held within the slotted groove 3' by means of the slot/rod pin 5. The connector pin 5 extends through the female openings 5' and through the slot 4' to then be locked in place by means of the cotter pin 6, which extends through the female opening 6' in the pin 5.

The rotor 3 is rotatably driven by the electrical motor 9 which drives the rotor at the desired speed. As the rotor 3 is driven by the motor 9, the paddle bars or arms 1 which together extend across the complete diameter of the pot 17, ride on and sweep over the bottom of the pot 17.

The connections provided by the pivots 2 and slot 4' allow the radially extended arms 1 to move up and down and pivotally in the axial plane with respect to the rotor shaft 3.

The pivot pins 2 and the slotted, floating connector 4 thus allow the paddle arms 1 to adjust to the depth of the pot 17 and generally to accommodate the upper surface of the bottom 17' of the pot 17, while at least generally maintaining sweeping contact completely across the full diameter of the bottom 17' of the pot 17. If the upper bottom surface 17' of the pot 17 is not flat, the bottom edges of the arms 1 and the connector 4 can be contoured to properly mate with the upper contour of the pot bottom.

The starting and stopping of the motor 9 is controlled by the electrical switching circuitry of the controller 13 (note FIGS. 1–3), which also includes a timing circuit, and a temperature sensing circuit which receives temperature level information from the thermostat sensor 15 located in the interior of the pot 17. The controller 13 also includes electrical switching circuitry to control, by means of electrical power control line 19, the duration and amount of heating energy which is applied by the cooker 18 (note FIG. 1).

Two control set switches 11 and 12 are included on the controller box 13, the first 11 being used to shut off the agitator motor 9 when the temperature of the roux drops down to a set lower temperature level after the cooking has been terminated, while the second 12 sets the duration and temperature level of the timed cooking cycle.

The motor 9 and the controller box 13 are mounted on a bracket 10, which in turn is carried by a partial lid 7 that rests on and is carried by the curved, upper lip 21 of the pot 17. As can be seen on the right side of FIG. 3, the lid 7 preferably has a like, curved periphery on its underside to mate with the curvature of the lid 21.

The lid 7 (with its associated agitator and controller systems) are locked to the pot 17 by means of for example, two, opposed draw latches 16. The lid 7 also includes a first aperture 8 for the rotor 3 and a second aperture 14 for the stem of the thermostat sensor 15. The pot 17 preferably includes handles 20 for ease in handling and moving the pot 17.

The controller 13, the motor 9 and the source of heat 18 includes an appropriate power line source of AC current, which is not illustrated for simplicity purposes.

Although the heat source 18 is preferably electrical for ease in control, other sources of heat such as for example gas, etc., of course could be used with the proper control valves, etc. Likewise, because the specifics of such are not a part of this invention and because many different circuits are readily available to those of ordinary skill in the controllers art, the control circuitry of the controller 13 is not illustrated for simplicity purposes.

Method

In the preferred embodiment of the method of automatic roux making of the present invention, the ingredients of the roux, namely for example wheat flour and vegetable oil (or other source of fat), are put into the pot 17 to a level sufficiently high to cover the bulb of the thermostat sensor 15, for the ultimate mixing and cooking of the ingredients to produce the roux.

There are typically three levels of roux desired, namely "light," "medium" and "dark" as a measure of the browness of the final roux, which level is based on the length and temperature level of the cooking cycle of the ingredients. This degree of cooking, which determines the duration of the cooking time, is set by means of the cooker turn-off control set knob 12 which has appropriate markings indicating, for example, the three possible desired levels. The post-cooking, lowered temperature level for cutting off the agitator motor 9 is set by means of the motor cut-off control set knob 11.

Once all of the appropriate ingredients for the roux have been added to the pot 17 and the proper settings have been made at the control set knobs 11 and 12, the system is turned on causing power to flow to the cooking heat source 18 and to the agitator motor 9, causing heat to be applied to the roux mixture and the paddle arms or blades 1 to be swept across the bottom of the pot 17 mixing and moving the ingredients being heated. Once the temperature level reaches the desired cooking temperature, the control circuitry within the controller 13 maintains that constant level of temperature through control line 19 to the heat source 18 for the cooking time set by the cooker set knob 12. During this period of cooking time, the ingredients become cooked and form the desired color level of roux (for example light, medium or dark brown).

All during the heating and cooking cycle the rotating paddle arms 1 have continuously swept across the full bottom of the pot 17 preventing any of the roux ingredients being cooked from sitting on the bottom for a significant period of time and thus preventing any of the roux from being scorched.

After the controller 13 has determined that the cooking temperature has been maintained a sufficiently long period of time based on the setting of control knob 12, it cuts off the energy source to the cooking heat source 18, and, as a result, the temperature of the roux begins to drop over a period of time under ambient conditions. However, to continue to insure that no scorching of the roux occurs while the roux is still at a substantially elevated temperature, the controller 13 allows the agitator motor 9 to continue to run until the roux temperature reaches a sufficiently low, safe temperature level (as determined by the setting of the motor cut-off set knob 11). At this point, power to the motor is cut off by the controller 13 and the system is completely "off." The resulting roux can then be stored at regular room temperature and used as needed, or, alternatively, packaged and shipped out on a commercial basis for use by others.

As a typical example, subject of course to great variations, the following exemplary, detailed information is provided based on an actual installation which tested satisfactorily.

| Element | Exemplary Detail(s) |
| --- | --- |
| Pot 17 | Ten Gallons (Seventeen inches in dia. and Eighteen inches in ht.) |
| Speed of rotation of rotor 3 | Twenty RPM |
| Weight of a single arm 1 | Eight oz. |
| Weight of a floating connector 4 | Ten oz. |
| Amt. of wheat flour | Twenty-Five pounds |
| Amt. of oil | Two gallons |
| Cooking temp. | Three Hundred Fifty degrees F. |
| Cooking time | Sixty minutes (light) Seventy minutes (medium) Eighty minutes (dark) |
| Cut-off cooling temp. for motor 9 | One Hundred Thirty degrees F. |

Of course there can be great variations in the sizes and configurations of the cooking pot, although the container preferably should be circular in horizontal cross-section; the relative amount(s) of the ingredients, the particular ingredients and possible additives; the temperature level and time duration of the cooking cycle; the source of heat; and the particular control circuitry utilized in controller 13, as well as in the specifics of the other structural and method details illustrated and/or described.

Because may varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. An automatic cooker system for preparing a roux or the like, comprising:
   a cooking pot having a bottom and cylindrically shaped side walls;
   heat source means for heating and cooking fluid contents of said pot;

agitator means associated with the pot for mixing and moving the fluid contents of said pot, said agitator means including a centrally located rotor shaft extending down to a position in juxtaposition to the pot bottom;

at least one paddle arm located at the bottom of said rotor shaft and extending radially out from said shaft with its bottom edge in sweeping contact with the upper surface of the pot bottom;

a floating connector connecting said paddle arm to said rotor shaft by means of a connection which allows said paddle arm to move up and down and to pivot in the axial plane with respect to said rotor shaft; and a powered motor attached to said rotor shaft for rotatively driving it to move said paddle arms in sweeping contact across the bottom of said pot; and controller system means associated with said agitator means and said heat source for controlling the amount and duration of heating energy supplied to said heat source for said pot and for automatically controlling the power to said motor, said controller system including temperature sensing means for sensing the temperature of the contents of pot;

controller circuitry means associated with said temperature sensing means for controlling the heat level and duration of heating of said heat source to the pot until the desired set degree of color level of the roux is reached; and motor control circuitry means associated with said motor for maintaining the motor in operation while the roux is being cooked and for a significant period of time thereafter while the cooked roux is cooking down until a safe, lowered temperature is reached.

2. The cooker system of claim 1, wherein said motor control circuitry is operationally interconnected with said temperature sensing means sensing the point in time when the safe, lowered temperature is reached and cutting off the power to said motor.

3. The cooking system of claim 1, wherein said controller circuitry means further includes three setting point means producing three different color levels of roux, said setting point means affecting the amount of cooking of the roux.

4. The cooking system of claim 1, there is included at least two diametrically opposed paddle arms, and said connection includes a connector plate connected to said paddle arms by means of pivot pins; said connection further including a pin connection to said shaft fitting through a centrally located vertical slot in said connector plate, allowing said connector plate with its pivot connections to said paddle arms to move up and down.

5. The cooking system of claim 1, wherein there is included at least one pair of diametrically opposed, paddle arms.

* * * * *